United States Patent
Kariya et al.

(10) Patent No.: US 8,359,135 B2
(45) Date of Patent: Jan. 22, 2013

(54) CONTROL APPARATUS FOR AUTOMATIC TRANSMISSION

(75) Inventors: Shigeo Kariya, Fuji (JP); Yoshihide Shinso, Shizuoka (JP); Satoshi Takizawa, Yokohama (JP)

(73) Assignee: Jatco Ltd, Fuji-shi (JP)

( * ) Notice: Subject to any disclaimer, the term of this patent is extended or adjusted under 35 U.S.C. 154(b) by 260 days.

(21) Appl. No.: 12/946,429

(22) Filed: Nov. 15, 2010

(65) Prior Publication Data
US 2011/0125360 A1    May 26, 2011

(30) Foreign Application Priority Data

Nov. 20, 2009    (JP) .................................. 2009-265406

(51) Int. Cl.
*G06F 7/00* (2006.01)
*G06F 19/00* (2006.01)

(52) U.S. Cl. ...... 701/31.4; 701/29.1; 475/118; 475/218; 475/189; 475/190; 702/183; 702/185; 73/325; 73/640

(58) Field of Classification Search .................. 701/29.1, 701/31.4; 475/118–119, 218; 702/183–185; 73/325, 640
See application file for complete search history.

(56) References Cited

U.S. PATENT DOCUMENTS

| | | | |
|---|---|---|---|
| 5,609,067 A * | 3/1997 | Mitchell et al. | 74/336 R |
| 5,682,791 A * | 11/1997 | Liesener | 74/335 |
| 5,980,420 A * | 11/1999 | Sakamoto et al. | 476/10 |
| 6,030,311 A * | 2/2000 | Osumi | 476/42 |
| 6,074,320 A * | 6/2000 | Miyata et al. | 475/186 |
| 6,223,113 B1 * | 4/2001 | McCunn et al. | 701/62 |
| 6,569,051 B2 * | 5/2003 | Hirano et al. | 475/208 |
| 7,072,748 B2 * | 7/2006 | Kwon | 701/29.2 |
| 7,160,220 B2 * | 1/2007 | Shinojima et al. | 475/208 |
| 7,326,147 B2 * | 2/2008 | Imanishi et al. | 477/50 |
| 7,441,643 B2 * | 10/2008 | McCunn et al. | 192/48.601 |

(Continued)

FOREIGN PATENT DOCUMENTS

| | | |
|---|---|---|
| EP | 1 770 314 A2 | 4/2007 |
| JP | 9-244665 * | 8/1997 |

(Continued)

OTHER PUBLICATIONS

Dual-Mode Power-Split Transmission for Hybrid Electric Vehicles; Mashadi, B.; Emadi, S.A.M.;Vehicular Technology, IEEE Transactions on; vol. 59, Issue: 7; Digital Object Identifier: 10.1109/TVT.2010.2049870; Publication Year: 2010, pp. 3223-3232.*

(Continued)

*Primary Examiner* — Cuong H Nguyen
(74) *Attorney, Agent, or Firm* — Foley & Lardner LLP

(57) ABSTRACT

An control apparatus for an automatic transmission includes: a failure shift stage setting section configured to set, to the target shift stage, a shift stage which can be attained in a state in which the one of the solenoids judged that the failure is generated is not energized; and a failure neutral state through section configured to control the solenoids at a predetermined vehicle speed or over so that the automatic transmission is brought to a neutral state, when the target shift stage is a shift stage at which the vehicle speed is suddenly decreased when the solenoids are controlled so that the automatic transmission attains the target shift stage, and to control the solenoids below the predetermined vehicle speed so that the automatic transmission attains the target shift stage.

4 Claims, 7 Drawing Sheets

U.S. PATENT DOCUMENTS

| | | | |
|---|---|---|---|
| 7,513,850 B2 * | 4/2009 | Yoneyama | 477/80 |
| 7,749,122 B2 * | 7/2010 | Yoneyama | 475/116 |
| 8,147,380 B2 * | 4/2012 | Fritzer | 477/158 |

FOREIGN PATENT DOCUMENTS

| | | | |
|---|---|---|---|
| JP | 9-269817 | * | 10/1997 |
| JP | 2000-161480 A | | 6/2000 |
| JP | 2002-117071 | * | 4/2002 |
| JP | 2003-274208 | * | 7/2003 |
| JP | 2006-086883 | * | 3/2006 |
| JP | 2006-092802 | * | 3/2006 |
| KR | 2002-12940 | * | 3/2002 |
| WO | WO2008/049735 | * | 5/2008 |

OTHER PUBLICATIONS

The wear characteristics on bearing outer ring of planetary gear in conflux planet gear train of power-shift steering transmission Hongwei Wang; Biao Ma; Hailing Zhang; Man Chen; Reliability, Maintainability and Safety (ICRMS), 2011 9th International Conference on;Digital Object Id.: 10.1109/ICRMS.2011.5979461; Pub. Yr: 2011, pp. 1252-1256.*

Development of pneumatically automatic mechanical transmission for a pure electric garbage truck; Guangming Xiong; Junqiang Xi; Yong Zhai; Yuhui Hu; Yang Yu; Huiyan Chen; Industrial Technology (ICIT), 2010 IEEE International Conference on Digital Object Identifier: 10.1109/ICIT.2010.5472582; Publication Year: 2010, pp. 1108-1112.*

Engine speed control for the automatic manual transmission during shift process; Zaimin Zhong; Qiang Lv; Guoling Kong Consumer Electronics, Communications and Networks (CECNet), 2012 2nd International Conference on; Digital Object Identifier: 10.1109/CECNet.2012.6202217; Publication Year: 2012, pp. 1014-1017.*

Application of Time-Optimal Strategy and Fuzzy Logic to the Engine Speed Control during the Gear-Shifting Process of AMT Xiaofeng Yin; Dianlun Xue; Yun Cai; Fuzzy Systems and Knowledge Discovery, 2007. FSKD 2007. Fourth International Conference on;vol. 4 Digital Obj. Id: 10.1109/FSKD.2007.184;Pub. Yr: 2007, pp. 468-472.*

Operation Pattern Recognition and Control for an Electric-Hydraulic Type AMT; Jinyu Qu; Yirui Zhang; Computational Intelligence and Design, 2009. ISCID '09. Second International Symposium on; vol. 1; Digital Object Identifier: 10.1109/ISCID.2009.83; Publication Year: 2009, pp. 302-305.*

* cited by examiner

| | 1 WITH ENGINE BRAKING | 1 WITHOUT ENGINE BRAKING | 2 | 3 | 4 | R |
|---|---|---|---|---|---|---|
| L/C | ○ | ○ | ○ | ○ | × | × |
| 24/B | × | × | ○ | × | ○ | × |
| H/C | × | × | × | ○ | ○ | × |
| L&R/B | ○ | × | × | × | × | ○ |
| REV/C | × | × | × | × | × | ○ |

|  | 1 ENGINE BRAKING | 1 | 2 | 3 | 4 |
|---|---|---|---|---|---|
| L/C SOL (N/H) | × | × | × | × | ○ |
| 24/B SOL (N/L) | × | × | ○ | × | ○ |
| H/C-L&R/B SOL (N/H) | × | ○ | ○ | × | × |
| ON/OFF SOL (N/L) | ○ | × | × | × | × |

| | STATE OF MONITOR VALUE | | | |
|---|---|---|---|---|
| OUTPUT STATE FROM CPU | NORMAL STATE | GND short | Open circuit | Vbatt short |
| ON(High) | Low | High | Low | Low |
| OFF(Low) | High | High | Low | Low |

FIG.7

| SOL | FAILURE | ELECTRIC SIGNAL TO SOL | STATE OF SOL AT FAILURE | 1 ENGINE BRAKING | 1 | 2 | 3 | 4 | COUNTERMEASURE AT SOL FAILURE |
|---|---|---|---|---|---|---|---|---|---|
| L/C SOL (N/H) | GND SHORT | OFF | High | NO INFLUENCE | NO INFLUENCE | NO INFLUENCE | NO INFLUENCE | INTERLOCK | |
| | Open circuit | OFF | High | NO INFLUENCE | NO INFLUENCE | NO INFLUENCE | NO INFLUENCE | INTERLOCK | FIXATION TO 3RD |
| | Vbatt short | ON | Low | NEUTRAL | NEUTRAL | NEUTRAL | NEUTRAL | NO INFLUENCE | |
| 24/B SOL (N/L) | GND SHORT | OFF | Low | NO INFLUENCE | NO INFLUENCE | NEUTRAL | NEUTRAL | NEUTRAL | AFTER NEUTRAL, FIXATION TO 3RD |
| | Open circuit | OFF | Low | NO INFLUENCE | NO INFLUENCE | NEUTRAL | NO INFLUENCE | NO INFLUENCE | |
| | Vbatt short | ON | High | INTERLOCK | 2ND | NO INFLUENCE | INTERLOCK | NO INFLUENCE | |
| H/C-L&R/B SOL (N/H) | GND SHORT | OFF | High | NO INFLUENCE | 3RD | INTERLOCK | NO INFLUENCE | NO INFLUENCE | FIXATION TO 3RD |
| | Open circuit | OFF | High | NO INFLUENCE | 3RD | INTERLOCK | NO INFLUENCE | NO INFLUENCE | |
| | Vbatt short | ON | Low | 1ST | NO INFLUENCE | NO INFLUENCE | NEUTRAL | NEUTRAL | |
| ON/OFF SOL (N/L) | GND SHORT | OFF | Low | 3RD | NO INFLUENCE | NO INFLUENCE | NO INFLUENCE | NO INFLUENCE | AFTER NEUTRAL, FIXATION TO 2ND |
| | Open circuit | OFF | Low | 3RD | NO INFLUENCE | NO INFLUENCE | NO INFLUENCE | NO INFLUENCE | |
| | Vbatt short | ON | High | NO INFLUENCE | NO INFLUENCE | NO INFLUENCE | 1ST ENGINE BRAKING | INTERLOCK | |

FIG.9

| SOL | FAILURE | ELECTRIC SIGNAL TO SOL | STATE OF SOL AT FAILURE | 1 ENGINE BRAKING | 1 | 2 | 3 | 4 | COUNTERMEASURE AT SOL FAILURE |
|---|---|---|---|---|---|---|---|---|---|
| L/C SOL (N/H) | GND SHORT | OFF | High | NO INFLUENCE | NO INFLUENCE | NO INFLUENCE | NO INFLUENCE | INTERLOCK | |
| | Open circuit | OFF | High | NO INFLUENCE | NO INFLUENCE | NO INFLUENCE | NO INFLUENCE | INTERLOCK | FIXATION TO 3RD |
| | Vbatt short | ON | Low | NEUTRAL | NEUTRAL | NEUTRAL | NEUTRAL | NO INFLUENCE | |
| 2-4/B SOL (N/L) | GND SHORT | OFF | Low | NO INFLUENCE | NO INFLUENCE | NEUTRAL | NO INFLUENCE | NEUTRAL | |
| | Open circuit | OFF | Low | NO INFLUENCE | NO INFLUENCE | NEUTRAL | NO INFLUENCE | NEUTRAL | AFTER NEUTRAL, FIXATION TO 3RD |
| | Vbatt short | ON | High | INTERLOCK | 2ND | NO INFLUENCE | INTERLOCK | NO INFLUENCE | |
| H/C-L&R/B SOL (N/H) | GND SHORT | OFF | High | NO INFLUENCE | 3RD | INTERLOCK | NO INFLUENCE | NO INFLUENCE | |
| | Open circuit | OFF | High | NO INFLUENCE | 3RD | INTERLOCK | NO INFLUENCE | NO INFLUENCE | FIXATION TO 3RD |
| | Vbatt short | ON | Low | 1ST | NO INFLUENCE | NO INFLUENCE | NEUTRAL | NEUTRAL | |
| ON/OFF SOL (N/L) | GND SHORT | OFF | Low | 3RD | NO INFLUENCE | NO INFLUENCE | NO INFLUENCE | NO INFLUENCE | |
| | Open circuit | OFF | Low | 3RD | NO INFLUENCE | NO INFLUENCE | NO INFLUENCE | NO INFLUENCE | AFTER NEUTRAL, FIXATION TO 3RD |
| | Vbatt short | ON | High | NO INFLUENCE | NO INFLUENCE | NO INFLUENCE | 1ST ENGINE BRAKING | INTERLOCK | |

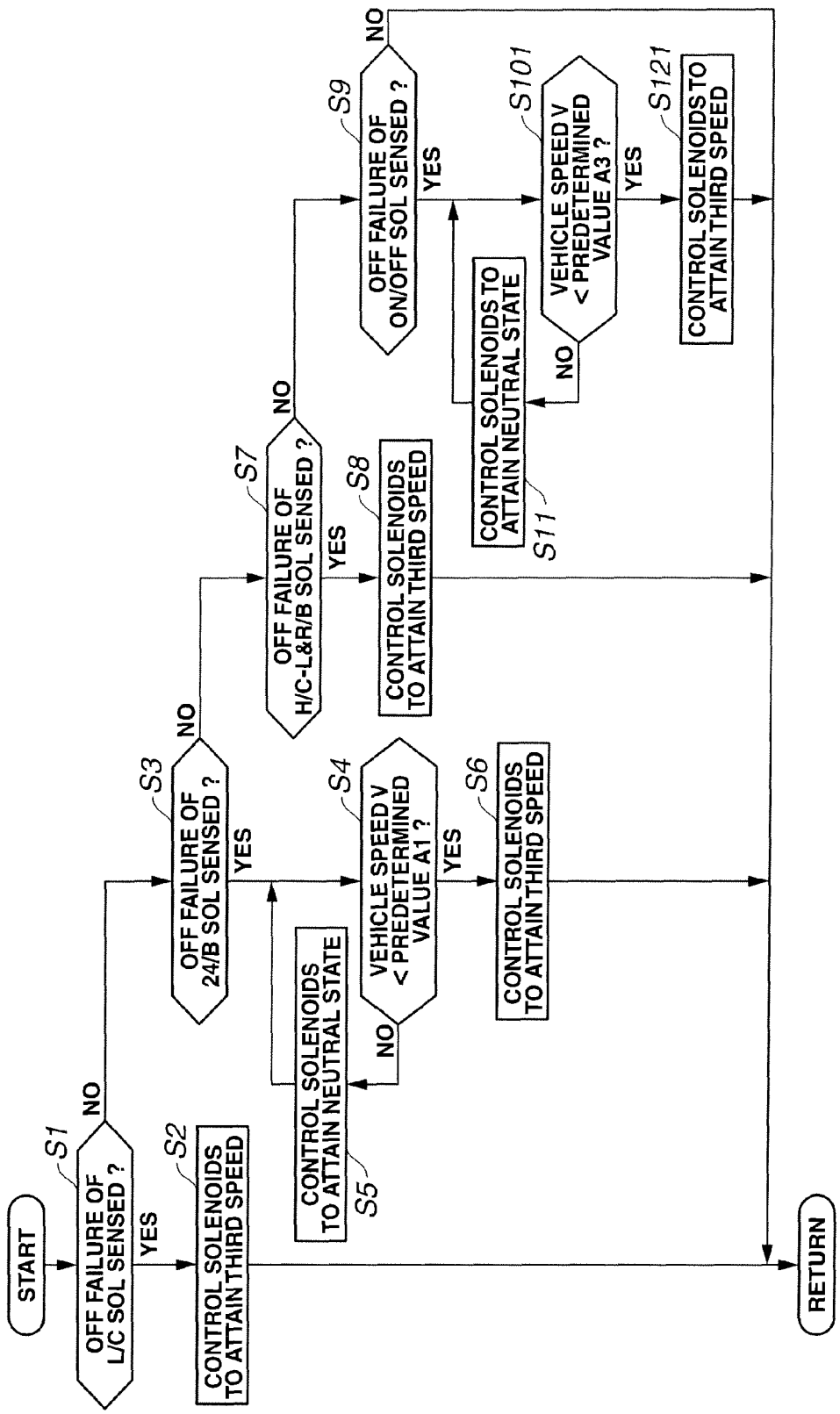

CONTROL APPARATUS FOR AUTOMATIC TRANSMISSION

BACKGROUND OF THE INVENTION

This invention relates to a control apparatus for an automatic transmission arranged to shift by actuations of a plurality of solenoids.

U.S. Pat. No. 6,223,113 (corresponding to Japanese Patent Application Publication No. 2000-161480) discloses an apparatus configured to shift, in accordance with a failure (malfunction) of a solenoid, to a shift stage which can be used even at the failure state of the solenoid.

SUMMARY OF THE INVENTION

However, the above-described apparatus needs a new (special) circuit for sensing a short failure (short-circuit failure) to a battery. Accordingly, the cost is increased.

It is, therefore, an object of the present invention to provide a control apparatus for an automatic transmission which is devised to solve the above mentioned problem, to suppress an increase of a cost, and to ensure a safety by sensing a failure of a short-circuit to a battery.

According to one aspect of the present invention, an control apparatus for an automatic transmission arranged to selectively engage a plurality of frictional engagement elements by controlling driving states or non-driving states of the plurality of solenoids so as to attain a predetermined target shift stage, the control apparatus comprises: a failure judging section configured to judge one of the solenoids in which a failure that the one of the solenoids is not energized is generated; a failure shift stage setting section configured to set, to the target shift stage, a shift stage which can be attained in a state in which the one of the solenoids judged that the failure is generated is not energized when the failure judging section judges the failure of the one of the solenoids; a failure neutral state through section configured to control the driving states or the non-driving states of the plurality of the solenoids at a vehicle speed equal to or greater than a predetermined value so that the automatic transmission is brought to a neutral state, when the target shift stage set by the failure shift stage setting section is a shift stage at which the vehicle speed is suddenly decreased when the driving states or the non-driving states of the solenoids are controlled so that the automatic transmission attains the target shift stage set by the failure shift stage setting section, and to control the driving states or the non-driving states of the plurality of the solenoids at a vehicle speed smaller than the predetermined value so that the automatic transmission attains the target shift stage set by the failure shift stage setting section, when the target shift stage set by the failure shift stage setting section is a shift stage at which the vehicle speed is suddenly decreased when the driving states or the non-driving states of the solenoids are controlled so that the automatic transmission attains the target shift stage set by the failure shift stage setting section; and a failure shift section configured to control the driving states or the non-driving states of the plurality of the solenoids irrespective of the vehicle speed so that the automatic transmission attains the target shift stage set by the failure shift stage setting section when the target shift stage set by the failure shift stage setting section is not the shift stage at which the vehicle speed is suddenly decreased when the driving states or the non-driving states of the plurality of the solenoids are controlled so that the automatic transmission attains the target shift stage set by the failure shift stage setting section.

BRIEF DESCRIPTION OF THE DRAWINGS

FIG. 7 is a table showing a relationship between failure patterns and transmission states of the automatic transmission according to the first embodiment.

FIG. 9 is a table showing a relationship between failure patterns and transmission states of an automatic transmission according to a second embodiment of the present invention.

FIG. 10 is a flowchart showing a failure shift control operation of the control apparatus according to the second embodiment of the present invention.

DETAILED DESCRIPTION OF THE INVENTION

Figure 1:
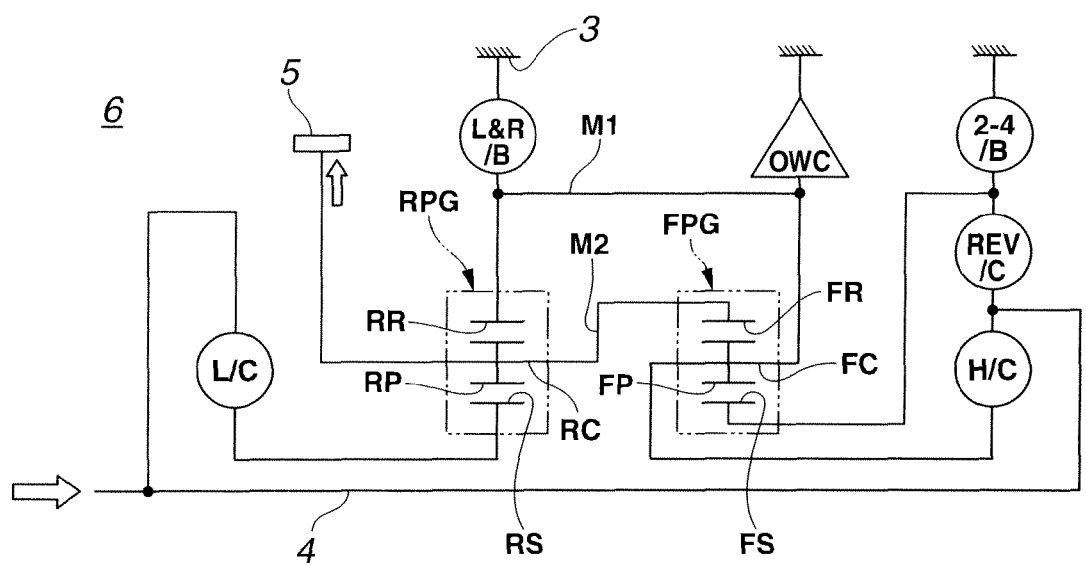
FIG. 1 is a skeleton diagram showing a power train of an automatic transmission which employs an control apparatus of an automatic transmission according to a first embodiment of the present invention.

FIG. 1 is a skeleton diagram showing a power train 6 of an automatic transmission AT which employs a control apparatus of an automatic transmission according to a first embodiment of the present invention. Hereinafter, a structure of the power train 6 is illustrated with reference to FIG. 1. Power train 6 of automatic transmission AT includes a front planetary gear FPG which is a single pinion type, and a rear planetary gear RPG which is a single pinion type. Moreover, power train 6 includes a low clutch L/C, a low and reverse brake L&R/B, a 2-4 brake 2-4/B, a reverse clutch REV/C, a high clutch H/C which are frictional engagement elements, and a one-way clutch OWC disposed in parallel with low and reverse brake L&R/B. Front planetary gear FPG includes a front sun gear FS, a front ring gear FR, a front pinion FP engaged with front sun gear FS and front ring gear FR, and a front career FC supporting front pinion FP. Rear planetary gear RPG includes a rear sun gear RS, a rear ring gear RR, a rear pinion gear RP engaged with rear sun gear RS and rear ring gear RR, and a rear career RC supporting rear pinion gear RP.

Front career FC and rear ring gear RR are integrally connected with each other by a first rotation member M1. Front ring gear FR and rear career RC are integrally connected with each other by a second rotation member M2. Accordingly, by combining front planetary gear FPG and rear planetary gear RPG, power train 6 has a structure having four rotational elements (front sun gear FS, rear sun gear RS, first rotation member M1 and second rotation member M2) which are obtained by subtracting two rotational elements from six rotational elements. Front sun gear FS is arranged to be connected or disconnected through reverse clutch REV/C to a transmission input shaft 4. Front sun gear FS is arranged to be fixed through 2-4 brake 2-4/B to a transaxle case 3. Rear sun gear RS is arranged to be connected or disconnected through low clutch L/C to transmission input shaft 4. First rotation member M1 is arranged to be fixed through low and reverse brake L&R/B to transaxle case 3. First rotation member M1 is arranged to be connected or disconnected through high clutch H/C to transmission input shaft 4. Second rotation member M2 is connected directly to a transmission output gear 5.

Figures 2, 3:
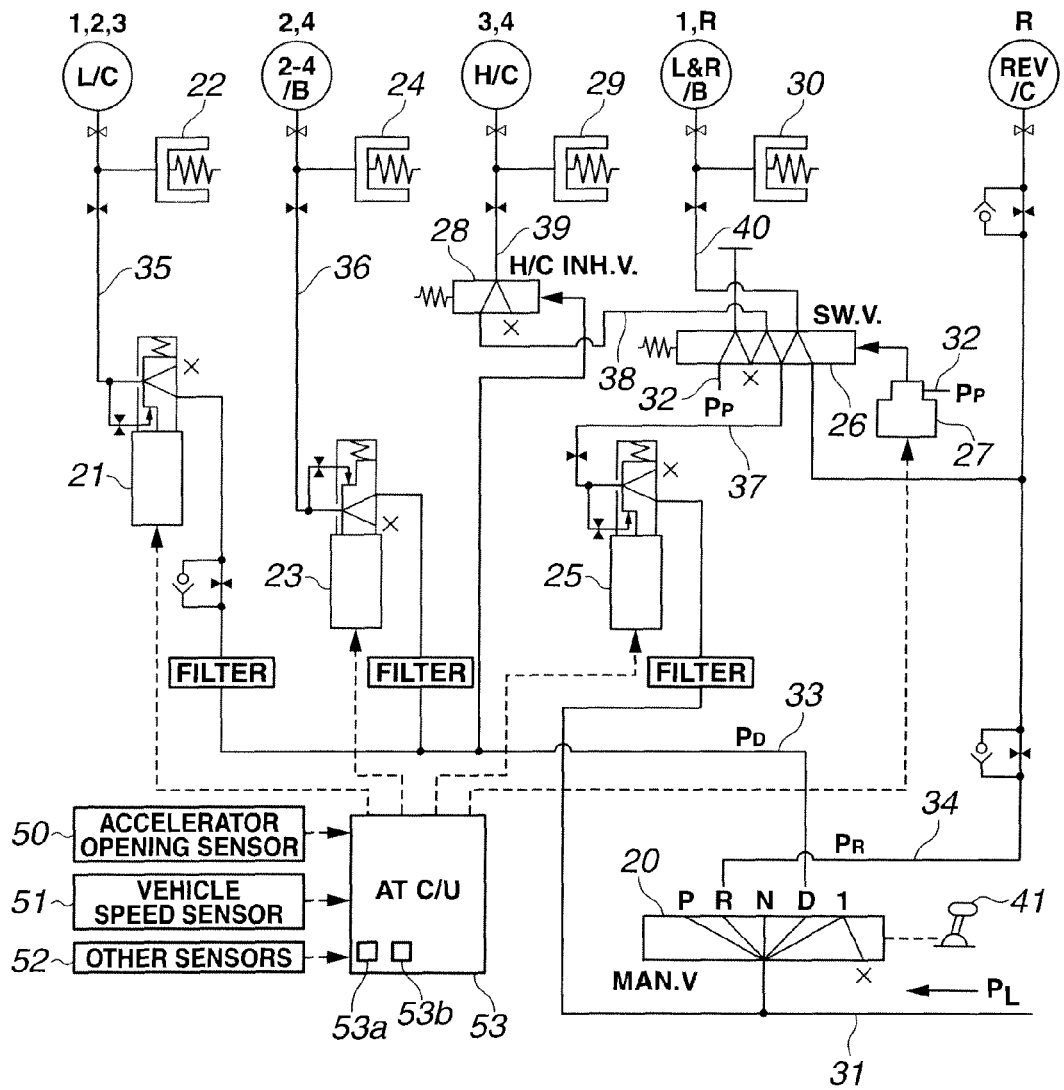
FIG. 2 is a hydraulic control system diagram showing an electronic shift control system and a hydraulic control circuit for a plurality of frictional engagement elements in a hydraulic control apparatus according to the first embodiment of the present invention.
FIG. 3 is an engagement table showing engagement states of frictional engagement elements at each shift stage of the automatic transmission which employs the control apparatus according to the first embodiment of the present invention.

FIG. 2 is a hydraulic control system diagram showing an electronic shift control system and a hydraulic control circuit for a plurality of frictional engagement elements in a hydraulic control apparatus according to the first embodiment. Hereinafter, a structure of the hydraulic control system is illustrated with reference to FIG. 2. As shown in FIG. 2, the hydraulic control circuit includes a manual valve 20, a low clutch pressure regulating valve 21, a low clutch accumulator 22, a 2-4 brake pressure regulating valve 23, a 2-4 brake accumulator 24, a sharing (dual-purpose) pressure regulating valve 25, a switching valve 26, a switching signal valve 27, a high clutch inhibitor valve 28, a high clutch accumulator 29, and a low and reverse brake accumulator 30. Moreover, the hydraulic control circuit includes a line pressure hydraulic passage 31, a pilot pressure hydraulic passage 32, a D range pressure hydraulic passage 33, an R range pressure hydraulic passage 34, a low clutch pressure hydraulic passage 35, a 2-4 brake pressure hydraulic passage 36, a sharing pressure output hydraulic passage 37, a first high clutch pressure hydraulic passage 38, a second high clutch pressure hydraulic passage 39, and a low and reverse brake pressure hydraulic passage 40.

Manual valve 20 is a manual operation valve which is operated (activated) by the driver's operation of a select lever 41. Select lever 41 includes a D range configured to attain shift stages (gear stages) from a first speed to a fourth speed (the engine braking is not actuated at the first speed), a second range configured to attain the first speed and the second speed (the engine braking is actuated at the first speed), an R range configured to attain a reverse shift stage, a neutral range configured to release all of the clutches, and a parking range. For example, manual valve 20 is arranged to introduce line pressure PL from line pressure hydraulic passage 31 to D range pressure hydraulic passage 33 when the D range is selected, and to introduce the line pressure PL from line pressure hydraulic passage 31 to R range pressure hydraulic passage 34 when the R range is selected.

Low clutch pressure regulating valve 21 includes a low clutch solenoid L/C SOL. Low clutch pressure regulating valve 21 is a 3-way large capacity linear solenoid valve having a characteristic of a normal high. The normal high represents a setting in which the hydraulic pressure is supplied when the solenoid is switched to the OFF state. When low clutch solenoid L/C SOL is disengaged, the low clutch pressure supplied to low clutch L/C is drained by switching low clutch solenoid L/C SOL to the ON state. 2-4 brake pressure regulating valve 23 includes a 2-4 brake solenoid 24/B SOL. 2-4 brake pressure regulating valve 23 is a 3-way large capacity linear solenoid valve having a characteristic of a normal low. The normal low represents a setting in which the hydraulic pressure is not supplied when the solenoid is switched to the OFF state. At the engagement of 2-4 brake 2-4/B, 2-4 brake pressure which is obtained by regulating D range pressure PD from D range pressure hydraulic passage 33 as a source pressure is introduced through 2-4 brake pressure hydraulic passage 36 to 2-4 brake 2-4/B. At the disengagement of 2-4 brake 2-4/B, 2-4 brake pressure supplied to 2-4 brake 2-4/B is drained.

Sharing pressure regulating valve 25 includes a sharing solenoid H/C-L&R/B SOL. Sharing pressure regulating valve 25 is a 3-way large capacity linear solenoid valve having the characteristic of the normal high to generate the hydraulic pressure in the power OFF state. By the hydraulic pressure obtained by regulating the hydraulic pressure (line pressure PL) supplied without through manual valve 20 as the source pressure, sharing pressure regulating valve 25 is arranged to regulate, through switching valve 26, the hydraulic pressures of two frictional engagement elements of high clutch H/C and low and reverse brake L&R/B. High clutch H/C of the two frictional engagement elements is arranged to connect transmission input shaft 4 and first rotation member M1 which is other than transmission output gear 5 that is a transmission output member. High clutch H/C is arranged to rotate by the torque of transmission input shaft 4 of first rotation member M1 when high clutch H/C is engaged during the idling state at the N range (neutral range) in a state in which transmission output gear 5 is fixed by a depression of a brake pedal (not shown) and so on.

Switching valve 26 is arranged to switch a connection between hydraulic passages by a switching signal hydraulic pressure from a switching signal valve 27. Switching valve 27 includes an ON/OFF solenoid ON/OFF which is a solenoid valve having a characteristic (property) (hereinafter, referred to as the normal low) in which the hydraulic pressure is not produced in the power OFF state. Switching valve 26 is arranged to supply the hydraulic pressure generated from sharing pressure regulating valve 25 to high clutch H/C when switching signal valve 27 is the OFF state (the switching signal hydraulic pressure is not generated) at the selection of the D range (forward range). On the other hand, switching valve 26 is arranged to supply the hydraulic pressure from sharing pressure regulating valve 25 to low and reverse brake L&R/B when switching signal valve is in the ON state (the switching signal hydraulic pressure is generated) at the shift at the selection of the R range (reverse shift range). Moreover, switching valve 26 is arranged to open a portion which is for supplying R range pressure PR that is from manual valve 20, and that is generated at the R range, when switching signal valve 27 is in the OFF state and switching signal valve 27 is in a position to supply the hydraulic pressure generated from sharing pressure regulating valve 25, to high clutch inhibitor valve 28. High clutch inhibitor valve 28 is disposed between switching valve 26 and high clutch H/C. High clutch inhibitor valve 28 is arranged to be switched by receiving, as a signal pressure, D range pressure PD generated at the selection of the D range. High clutch inhibitor valve 28 is arranged to close a portion between sharing pressure regulating valve 25 and high clutch H/C when D range pressure PD is not acted.

Figures 4, 5, 6:
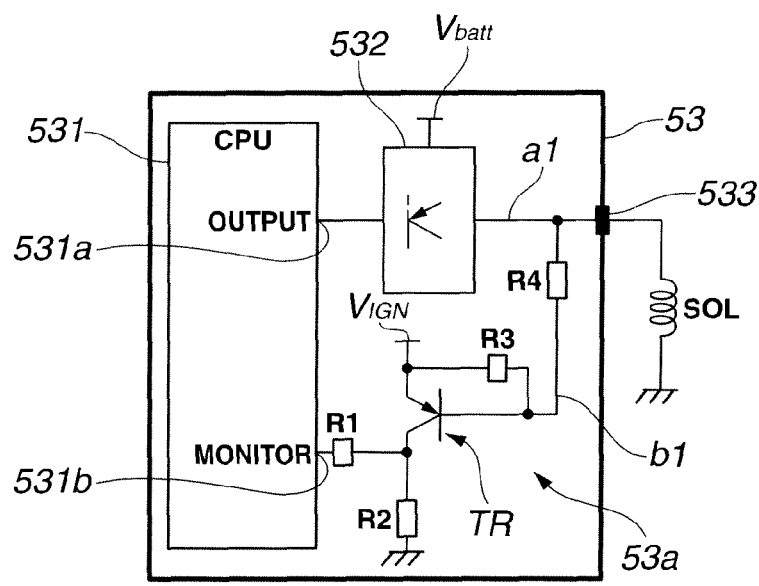
FIG. 4 is an actuation table of the solenoids of the automatic transmission which employs the control apparatus according to the first embodiment of the present invention.
FIG. 5 is a schematic view showing a solenoid failure sensing circuit in the control apparatus according to the first embodiment of the present invention.
FIG. 6 is a table showing a sensing logic in the solenoid failure sensing circuit of FIG. 5.

FIG. 3 is an engagement table showing engagement states of the frictional engagement elements at each shift stages of the automatic transmission which employs the control apparatus according to the first embodiment of the present invention. In FIG. 3, O represents an engaged state in which the corresponding frictional engagement element is engaged. In FIG. 4, O represents an energization state in which the corresponding one of the solenoids is energized (the current is applied to the corresponding one of the solenoids). The forward four speeds and the reverse speed are attained by a changeover shift. The changeover shift is attained by disengaging an engaged frictional engagement element of the frictional engagement elements provided in the power train, and by engaging a disengaged frictional engagement element of the frictional engagement elements.

The "first speed" at which the engine braking is actuated is attained by engaging low clutch L/C and low and reverse brake L&R/B. In this case, the only ON/OFF solenoid ON/OFF SOL is switched to the ON state, and the other solenoids are switched to the OFF state. The "first speed" at which the engine braking is not actuated is attained by engaging only low clutch L/C. In this case, the only sharing solenoids H/C-L&R/B SOL is switched to the ON state, and the other solenoids are switched to the OFF state. The "second speed" is attained by engaging low clutch L/C and 2-4 brake 2-4/B. In this case, 2-4 brake solenoid 24/B SOL and sharing solenoid H/C-L&R/B SOL are switched to the ON state, and the other solenoids are switched to the OFF state. The "third speed" is attained by engaging low clutch L/C and high clutch H/C. In this case, all of the solenoids are switched to the OFF state. The "fourth speed" is attained by engaging high clutch H/C and 2-4 brake 2-4/B. In this case, low clutch solenoid L/C SOL and 2-4 brake solenoid 24/B SOL are switched to the ON state, and the other solenoids are switched to the OFF state. The "reverse speed" is attained by engaging reverse clutch REV/C and low and reverse brake L&R/B. In this case, manual valve 20 is switched to the R range in a mechanical manner (by the driver's operation). Accordingly, the "reverse speed" is attained in a state in which all of the solenoids are in the OFF state.

The electronic shift control system includes an accelerator opening sensor 50, a vehicle speed sensor 51, other sensors 52 (transmission input rotational speed sensor, inhibitor switch and so on), and an AT control unit 53. AT control unit 53 receives an information (signal) from accelerator opening sensor 50, an information (signal) from vehicle speed sensor 51, and an information (signals) from other sensors 52. AT control unit 53 is configured to seek an appropriate shift stage from a position of a driving point in a shift map, which is determined by accelerator opening APO and vehicle speed VSP, for example, when the vehicle runs at the selection of the D range. AT control unit 53 is configured to output a control command for obtaining the sought shift stage, to the solenoids. The shift map sets an upshift line and a downshift line in accordance with the driving point determined by the accelerator opening and the vehicle speed.

AT control unit 53 includes a solenoid failure sensing circuit 53a configured to sense an OFF failure (malfunction) of each of the solenoids, and a failure shift control section 53b (failure shift stage setting section) configured to set, to the target shift stage, the shift stage which can be attained in a state in which the solenoid judged that the failure is generated is not energized, in accordance with the sensed failure, and to perform various failure shift control operations. Moreover, failure shift control section 53b is configured to perform a failure neutral state through control operation to switch to the neutral state when a predetermined condition is satisfied in a case in which the vehicle speed may be suddenly decreased when (if) the target shift stage set at the failure (hereinafter, referred to as the failure target shift stage) is attained. Furthermore, failure shift control section 53b is configured to perform a failure shift control operation to shift to the target shift stage, irrespective of the satisfaction of the predetermined conditions in a case in which the vehicle speed is not suddenly decreased when the failure target shift stage is attained.

(Solenoid Failure Sensing Circuit) Next, the solenoid failure sensing circuit according to the first embodiment is illustrated. FIG. 5 is a schematic diagram showing solenoid failure sensing circuit 53a according to the first embodiment. The schematic diagram shows one solenoid as example. However, each of the solenoids has an identical structure shown in FIG. 5. AT control unit 53 includes a CPU 531 having a predetermined control program and so on. This CPU 531 includes an output port 531a configured to output a driving command, and a monitor port 531b configured to sense the energization to the solenoid. The signal from output port 531a is outputted to a driving circuit 532. Driving circuit 532 is configured to convert a battery supply Vbatt to a predetermined voltage based on the driving signal from CPU 531, and to output this through a driving voltage supply circuit a1 to the solenoid. Driving voltage supply circuit a1 and the solenoid are connected with each other by a connector 533. A monitor circuit b1 is connected between driving voltage supply circuit a1 and monitor port 531b. Monitor circuit b1 includes resistors R1, R2, R3 and R4, and a transistor TR. Resistor R1 and R2 are set to voltages which can be sensed in monitor port 531b. Transistor TR is connected with an ignition power supply VIGN. The resistor value of resistor R3 and the resistor value of resistor R4 are set so that a base-emitter voltage to switch transistor TR to the OFF state is obtained when the output state from output port 531a is in the ON state, and so that the base-emitter voltage to switch transistor TR to the ON state is obtained when the solenoid is in the OFF state.

FIG. 6 is a table showing a sensing logic in the solenoid failure sensing circuit according to the first embodiment. When output port 531a outputs the ON signal (that is, the High level signal), the Low level signal of the monitor value is sensed in the normal state. On the other hand, when output port 531a outputs the OFF signal (that is, the Low level signal), the High level signal of the monitor value is sensed in the normal state. When the solenoid is grounded (hereinafter, referred to as GND short), the current constantly flows in resistor R4 from ignition power supply VIGN connected with transistor TR. With this, the base voltage of transistor TR is lowered, and transistor TR is brought to the ON state. Accordingly, the monitor signal becomes the High level, irrespective of the High level or the Low level of the driving signal. When the solenoid is broken or disconnected (hereinafter, referred to as Open circuit), or when the solenoid is short-circuited (connected) directly to battery supply Vbatt (hereinafter, referred to as Vbatt short), the current does not flow in resistor R4 from ignition power supply VIGN of the monitor circuit. With this, the base voltage of transistor TR is increased, and transistor TR becomes the OFF state. Accordingly, the monitor signal becomes the Low level, irrespective of the High level or the Low level of the driving signal.

In the above-described relationship, in the control apparatus according to the first embodiment, a judgment shown in a portion surrounded by a bold line of FIG. 6 is performed. That is, the abnormal condition (failure) is not judged when the output state from CPU 531 is in the OFF state (the Low level), and also the monitor value represents the High level. On the other hand, it is judged that the GND short is generated when the output state from CPU 531 is in the ON state (the High level), and also the monitor value represents the High level. Moreover, the abnormal condition (failure) is not judged when the output state from CPU 531 is in the ON state (the High level), and also the monitor value represents the Low level. On the other hand, it is judged that the Open circuit or the Vbatt short is generated when the output state from CPU 531 is in the OFF state (the Low level), and also the monitor value is in the Low level. That is, in the solenoid failure sensing circuit according to the first embodiment, it is not possible to distinguish between the Open circuit and the Vbatt short. The Vbatt short is extremely less frequently generated.

Therefore, it is possible to suppress the increase of the cost by excluding the sensing circuit of the Vbatt short.

FIG. 7 is a table showing a relationship between failure patterns and transmission states in the automatic transmission according to the first embodiment of the present invention. As shown in the sensing logic of FIG. 6, even when CPU 531 senses the OFF failure of the solenoid, it is not possible to distinguish between the Open circuit and the Vbatt short. At the Open circuit, there is no problem since the solenoid is not energized. However, at the Vbatt short, the solenoid is energized. Accordingly, there is a problem that the discerned failure state is different from the actual actuation state. Hereinafter, the solenoid failures are illustrated.

(When OFF Failure of Low Clutch Solenoid is Sensed) When the OFF failure of low clutch solenoid L/C SOL is sensed, it is not possible to energize low clutch solenoid L/C SOL in case of the GND short and the Open circuit. Moreover, the hydraulic pressure is supplied in the non-energization state. However, low clutch L/C is arranged to be constantly engaged from the first speed to the third speed. Accordingly, there is no influence in this case. However, in case of the fourth speed, an interlock is generated by the engagement of low clutch L/C. In case of the Vbatt short, even when the other frictional engagement elements are engaged, the vehicle is brought to the neutral state by the disengagement of low clutch L/C. In case of the fourth speed, the fourth speed is merely attained. Accordingly, the third speed is selected as the failure target shift stage so as to respond to (address) any failures.

(When OFF Failure of 2-4 Brake Solenoid is Sensed) When 2-4 brake solenoid 24/B is in the OFF failure state, it is not possible to energize 2-4 brake solenoid 24/B SOL in case of the GND short and the Open circuit. Moreover, the hydraulic pressure is not supplied in the non-energization state. In case of the first speed (with the engine braking), the first speed and the third speed, 2-4 brake 2-4/B is not engaged. Accordingly, in case of the first speed (with the engine braking), the first speed and the third speed, there is no influence. In case of the second speed and the fourth speed, the vehicle is brought to the neutral state. Accordingly, there is no influence. Moreover, in case of the Vbatt short, 2-4 brake 2-4/B is engaged. Consequently, in case of the first speed (with the engine braking) and the third speed, the interlock is generated. At the first speed, the vehicle is brought to the second speed. Therefore, there are the second speed or the third speed as the choices. When the transmission gear ratio is fixed, the third speed can respond to various running conditions relative to the second speed. The probability that the Vbatt short is generated is extremely small. Accordingly, when the vehicle speed is higher than a predetermined value A1 representing an extreme low vehicle speed, the vehicle is brought to the neutral state once. Then, when the vehicle is in an extreme low vehicle speed state in which the vehicle speed is equal to or smaller than predetermined value A1, the third speed is selected as the failure target shift stage.

(When Off Failure of Sharing Solenoid is Sensed) When the OFF failure of sharing solenoid H/C-L&R/B SOL is sensed, it is not possible to energize sharing solenoid H/C-L&R/B SOL in case of the GND short and the Open circuit, and the hydraulic pressure is supplied in the non-energization state. In case of the first speed (with the engine braking), low and reverse brake L&R/B is merely engaged. In the case of the third speed and the fourth speed, there is no influence. In case of the first speed, the vehicle is brought to the third speed since the high clutch H/C is engaged. In case of the second speed, the interlock is generated. Moreover, in case of the Vbatt short, sharing solenoid H/C-L&R/B SOL is constantly in the ON state. Accordingly, there is no influence in case of the first speed and the second speed. However, even when the command of the first speed (with the engine braking) is outputted, the vehicle is brought to the normal first speed. Moreover, even when the command of the third speed or the fourth speed is outputted, the vehicle is brought to the neutral state. Accordingly, the third speed is selected as the failure target shift stage so as to respond to any failures.

(When Off Failure of on/Off Solenoid is Sensed) When the OFF failure of ON/OFF solenoid ON/OFF SOL is sensed, it is not possible to energize ON/OFF solenoid ON/OFF SOL in case of the GND short and the Open circuit, and the hydraulic pressure is not supplied in the non-energization state. In case of the first to fourth speeds, there is no influence. In case of the first speed (with the engine braking), the vehicle is brought to the third speed. Moreover, in case of the Vbatt short, in case of the first speed (with the engine braking), the first speed and the second speed, there is no influence. However, when the command of the third speed is outputted, the vehicle is brought to the first speed (with the engine braking). When the command of the fourth speed is outputted, the interlock is generated. This is because the hydraulic pressure is not supplied to low and reverse brake L&R/B if the D range is selected even when the signal of the ON/OFF solenoid ON/OFF SOL is outputted. Accordingly, the second speed which is not influenced in any cases is set as the failure target shift stage. In this case, when the transmission gear ratio is fixed to the second speed, the vehicle speed may be suddenly decreased at some vehicle speed by the large engine braking. Accordingly, when the vehicle speed is higher than a predetermined value A2 (>A1) representing a vehicle speed at which the sudden speed decrease is not generated at the second speed, the vehicle is brought to the neutral state once. Then, when the vehicle speed is equal to or smaller than predetermined value A2, the second speed is selected as the failure target shift stage.

Figure 8:
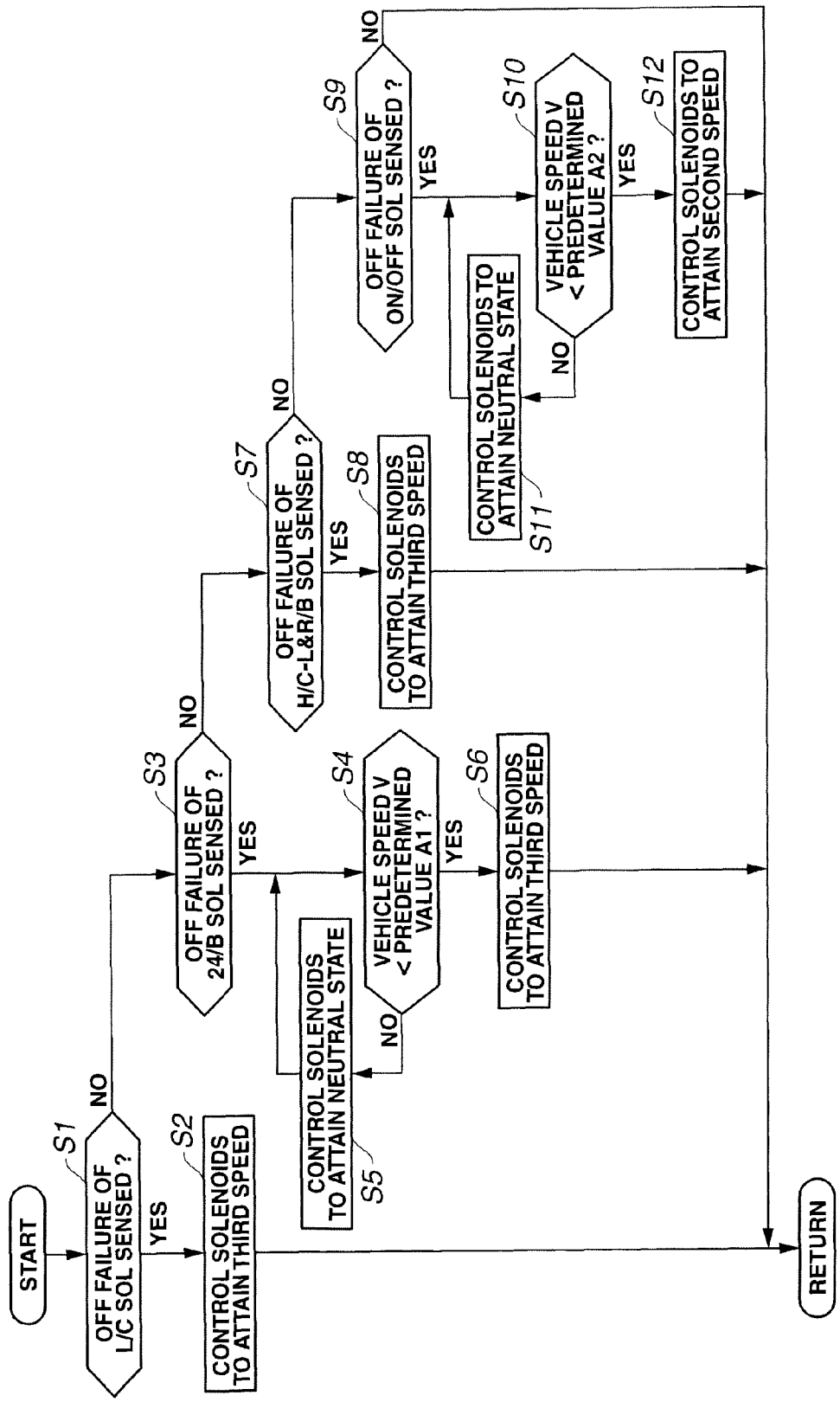
FIG. 8 is a flowchart showing a failure shift control operation of the control apparatus according to the first embodiment of the present invention.

(Failure Shift Control Operation) Next, the failure shift control operation is illustrated. FIG. 8 is a flowchart showing the failure shift control operation in the control apparatus according to the first embodiment of the present invention.

At step S1, it is judged whether or not the OFF failure that low clutch solenoid L/C SOL can not be energized is generated. When the answer of step S1 is affirmative (YES), the process proceeds to step S2. At step S2, the solenoids are controlled to attain the third speed. When the answer of step S1 is negative (NO), the process proceeds to step S3.

At step S3, it is judged whether or not the OFF failure that 2-4 brake solenoid 24/B SOL can not be energized is generated. When the answer of step S3 is affirmative (YES), the process proceeds to step S4. When the answer of step S3 is negative (NO), the process proceeds to step S7. At step S4, it is judged whether or not vehicle speed V is smaller than predetermined value A1. When the answer of step S4 is affirmative (YES), the process proceeds to step S6. At step S6, the solenoids are controlled to attain the third speed. When the answer of step S4 is negative (NO), the process proceeds to step S5. At step S5, the solenoids are controlled to attain the neutral state. This predetermined value A1 is set to a predetermined extreme low vehicle speed at which the sudden speed decrease is not generated even when the vehicle is shifted to the third speed at the generation of the Vbatt short and accordingly the interlock is generated. For attaining the neutral state, the activation states of the solenoids are set so that all of low clutch L/C, high clutch H/C, low and reverse brake L&R/B, and reverse clutch REV/C are disengaged. With this, even when 2-4 brake 2-4/B is engaged, it is possible to attain the neutral state. On the other hand, when the vehicle is shifted to the third speed, all of the solenoids are switched to the OFF state.

At step S7, it is judged whether or not the OFF failure that sharing solenoid H/C-L&R/B SOL can not be energized is generated. When the answer of step S7 is affirmative (YES), the process proceeds to step S8. At step S8, the solenoids are controlled to attain the third speed. When the answer of step S7 is negative (NO), the process proceeds to step S9.

At step S9, it is judged whether or not the OFF failure that ON/OFF solenoid ON/OFF SOL can not be energized is generated. When the answer of step S9 is affirmative (YES), the process proceeds to step S10. At step S10, it is judged whether or not the vehicle speed V is smaller than predetermined value A2. When the answer of step S10 is affirmative (YES), the process proceeds to step S12. At step S12, the solenoids are controlled to attain the second speed. When the answer of step S10 is negative (NO), the process proceeds to step S11. At step S11, the solenoids are controlled to attain the neutral state. For attaining the neutral state, the activation states of the solenoids are set so that all of the engagement elements are disengaged. With this, even when low and reverse brake L&R/B is engaged, it is possible to attain the neutral state if all of the other frictional engagement elements are disengaged. This predetermined value A2 is a vehicle speed such that the sudden vehicle speed decrease is not generated by the excessive engine braking force when the vehicle is shifted to the second speed. Accordingly, it is possible to shift to the second speed, irrespective of the generation of the Vbatt short. On the other hand, when the answer of step S9 is negative (NO), the OFF failure is not sensed in all of the solenoids, and the process is finished.

As mentioned above, it is possible to attain effects described below in the control apparatus according to the first embodiment.

(1) An control apparatus for an automatic transmission arranged to selectively engage a plurality of frictional engagement elements by controlling driving states or non-driving states of the plurality of solenoids so as to attain a predetermined target shift stage, the control apparatus includes: a failure judging section (53a, 53b) configured to judge one of the solenoids in which a failure that the one of the solenoids is not energized is generated; a failure shift stage setting section (53b; S2, S6, S8, S12) configured to set, to the target shift stage, a shift stage which can be attained in a state in which the one of the solenoids judged that the failure is generated is not energized when the failure judging section (53a, 53b) judges the failure of the one of the solenoids; a failure neutral state through section (S4, S5, S6 or step S10, S11, S12) configured to control the driving states or the non-driving states of the plurality of the solenoids at a vehicle speed equal to or greater than a predetermined value (A1 or A2) so that the automatic transmission is brought to a neutral state, when the target shift stage set by the failure shift stage setting section (53b) is a shift stage (2nd or 3rd) at which the vehicle speed is suddenly decreased when the driving states or the non-driving states of the solenoids are controlled so that the automatic transmission attains the target shift stage set by the failure shift stage setting section (53b), and to control the driving states or the non-driving states of the plurality of the solenoids at a vehicle speed smaller than the predetermined value (A1 or A2) so that the automatic transmission attains the target shift stage set by the failure shift stage setting section (53b), when the target shift stage set by the failure shift stage setting section (53b) is a shift stage (2nd or 3rd) at which the vehicle speed is suddenly decreased when the driving states or the non-driving states of the solenoids are controlled so that the automatic transmission attains the target shift stage set by the failure shift stage setting section (53b); and a failure shift section (53b; steps S2, S8) configured to control the driving states or the non-driving states of the plurality of the solenoids irrespective of the vehicle speed so that the automatic transmission attains the target shift stage set by the failure shift stage setting section (53b) when the target shift stage set by the failure shift stage setting section is not the shift stage at which the vehicle speed is suddenly decreased when the driving states or the non-driving states of the plurality of the solenoids are controlled so that the automatic transmission attains the target shift stage set by the failure shift stage setting section.

That is, there is no need to provide a new (special) circuit configured to sense the short-circuit failure (Vbatt short) of the solenoid. Accordingly, it is possible to suppress increase of the cost. In addition, at the failure target shift stage at which the vehicle speed is suddenly decreased, it is possible to prevent the sudden speed decrease of the vehicle at the high vehicle speed by through (via) the neutral state. With this, it is possible to stabilize the vehicle behavior (movement). On the other hand, when the failure target shift stage set at the failure of the solenoid is not the shift stage at which the vehicle speed may be suddenly decreased, it is possible to rapidly ensure the driving force of the vehicle by controlling the driving states or the non-driving states of the plurality of the solenoids so that automatic transmission AT attains the failure target shift stage, irrespective of the vehicle speed.

(2) The failure neutral state through section (53b, step S4, S5, S6 or S10, S11, S12) is configured to control the driving states or the non-driving states of the plurality of the solenoids at the vehicle speed equal to or greater than the predetermined value (A1 or A2) so that the automatic transmission is brought to the neutral state, when the target shift stage set by the failure shift stage setting section (53b) is the shift stage at which the vehicle speed is suddenly decreased when the one of the solenoids judged that the failure is generated is energized when the automatic transmission attains the target shift stage, and to control the driving states or the non-driving states of the plurality of the solenoids at the vehicle speed smaller than the predetermined value (A1 or A2) so that the automatic transmission attains the target shift stage set by the failure shift stage setting section (53b), when the target shift stage set by the failure shift stage setting section (53b) is the shift stage at which the vehicle speed is suddenly decreased when the one of the solenoids judged that the failure is generated is energized when the automatic transmission attains the target shift stage; and the failure shift section (53b; steps S2, S8) is configured to control the driving states or the non-driving states of the plurality of the solenoids irrespective of the vehicle speed so that the automatic transmission attains the target shift stage set by the failure shift stage setting section (53b) when the target shift stage set by the failure shift stage setting section (53b) is not the shift stage at which the vehicle speed is suddenly decreased when the solenoid judged that the failure is generated is energized when the automatic transmission attains the target shift stage.

That is, there is no need to provide a new (special) circuit configured to sense the short-circuit failure (Vbatt short) of the solenoids. Accordingly, it is possible to suppress the increase of the cost. In addition, at the failure shift stage at which the vehicle speed is suddenly decreased, it is possible to prevent the sudden vehicle speed decrease at the high vehicle speed by through (via) the neutral state. Consequently, it is possible to stabilize the vehicle behavior (movement). On the other hand, when the failure target shift stage set at the failure of the solenoid is not the shift stage at which the vehicle speed is not suddenly decreased, it is possible to rapidly ensure the driving force of the vehicle by controlling the driving states or the non-driving states of the plurality of the solenoids so that automatic transmission AT attains the failure target shift stage, irrespective of the vehicle speed.

(3) The failure neutral state through section (53b, step S4, S5, S6 or S10, S11, S12) is configured to control the driving states or the non-driving states of the plurality of the solenoids at a vehicle speed equal to or greater than a predetermined value (A1) so that the automatic transmission is brought to the neutral state, when the target shift stage (3rd) set by the failure shift stage setting section (53b) is a shift stage at which the automatic transmission (AT) is interlocked when the one of the solenoids (24B SOL) judged that the failure is generated is energized when the automatic transmission (AT) attains the target shift stage, and to control the driving states or the non-driving states of the plurality of the solenoids at a vehicle speed smaller than the predetermined value (A1) so that the automatic transmission (AT) attains the target shift stage set by the failure shift stage setting section (53b), when the target shift stage (3rd) set by the failure shift stage setting section (53b) is a shift stage at which the automatic transmission (AT) is interlocked when the one of the solenoids (24B SOL) judged that the failure is generated is energized when the automatic transmission (AT) attains the target shift stage; and the failure shift section is configured to control the driving states or the non-driving states of the plurality of the solenoids irrespective of the vehicle speed so that the automatic transmission attains the target shift stage set by the failure shift stage setting section when the target shift stage set by the failure shift stage setting section (53b) is not the shift stage at which the automatic transmission is interlocked when the one of the solenoids (24B SOL) judged that the failure is generated is energized when the automatic transmission (AT) attains the target shift stage.

That is, there is no need to provide a new (special) circuit configured to sense the short-circuit failure (Vbatt short) of the solenoid. Accordingly, it is possible to suppress the increase of the cost. In addition, at the failure target shift stage at which the vehicle is brought to the interlock state, it is possible to prevent the sudden vehicle speed decrease at the failure of the solenoid at the high vehicle speed by through (via) the neutral state. Consequently, it is possible to stabilize the vehicle behavior (movement). On the other hand, when the failure target shift stage set at the failure of the solenoid is not the shift stage at which the vehicle is brought to the interlock state, it is possible to rapidly ensure the driving force of the vehicle by controlling the driving states or the non-driving states of the plurality of the solenoids.

Second Embodiment

Next, a control apparatus according to a second embodiment of the present invention is illustrated. The control apparatus according to the second embodiment has a basic structure identical to that of the control apparatus according to the first embodiment. Points different from the first embodiment are illustrated below. FIG. 9 is a table showing a relationship between failure patterns and transmission states of the automatic transmission according to the second embodiment of the present invention. In the control apparatus according to the first embodiment, at the OFF failure of ON/OFF solenoid ON/OFF SOL, the second speed is selected as the failure target shift stage after via the neutral state. In the control apparatus according to the second embodiment, the third speed is selected as the failure target shift stage after via the neutral state, unlike the first embodiment.

(When OFF Failure of ON/OFF Solenoid is Sensed) When the OFF failure of ON/OFF solenoid ON/OFF SOL is sensed, it is not possible to energize ON/OFF solenoid ON/OFF SOL in case of the GND short and the Open circuit, and the hydraulic pressure is not supplied in the non-energization state. In case of the first to fourth speeds, there is no influence. In case of the first speed (with the engine braking), the shift stage becomes the third speed. In case of the Vbatt short, in case of the first speed (with the engine braking), the first speed and the second speed, there is no influence. When the command of the third speed is outputted, the shift stage becomes the first speed (with the engine braking). When the command of the fourth speed is outputted, the interlock is caused. This is because the hydraulic pressure is not supplied to low and reverse brake L&R/B if the D range is selected even when the signal of ON/OFF solenoid ON/OFF SOL is outputted. In this case, when the transmission gear ratio is fixed, the third speed can respond to the various running circumstances relative to the second speed. Moreover, provability that the Vbatt short is generated is extremely low. Accordingly, the failure target shift stage is set to the third speed. In this case, if the Vbatt short is generated, the first speed (with the engine braking) is selected (attained). Accordingly, the sudden vehicle speed decrease may be generated by the excessive engine braking at some vehicle speeds. Therefore, even when the first speed (with the engine braking) is selected, in a case in which the vehicle speed is higher than a predetermined value A3 (<A2) representing a vehicle speed at which the sudden vehicle speed decrease is not generated, the vehicle is brought to the neutral state once, and then the third speed is selected as the failure target shift stage at the low vehicle speed equal to or smaller than the predetermined value A3.

(Failure Shift Control Operation) Next, the failure shift control operation is illustrated. FIG. 10 is a flowchart showing a failure shift control operation according to the second embodiment of the present invention. Steps S1-S9 are identical to the steps S1-S9 of the first embodiment. Steps after step S9 are illustrated below.

At step S9, it is judged whether or not the OFF failure that ON/OFF solenoid ON/OFF SOL can not be energized is generated. When the answer of step S9 is affirmative (YES), the process proceeds to step S101. At step S101, it is judged whether or not vehicle speed V is smaller than predetermined value A3. When the answer of step S101 is affirmative (YES), the process proceeds to step S121. At step S121, the solenoids are controlled to attain the third speed. When the answer of step S101 is negative (NO), the process proceeds to step S11. At step S11, the solenoids are controlled to attain the neutral state. For attaining the neutral state, the activation states of the solenoids are set so that all of the engagement elements are disengaged. With this, even when low and reverse brake L&R/B is engaged, it is possible to attain the neutral state if the other frictional engagement elements are disengaged. This predetermined value A3 is a vehicle speed at which the sudden vehicle speed decrease is not generated by the excessive engine braking force even when the first speed (with the engine braking) is selected when the shift stage is shifted to the third speed. On the other hand, when the answer of step S9 is negative (NO), the OFF failures of all of the solenoids are not detected, and the process is finished.

(4) The failure neutral state through section (53b; S4, S5, S6 or S10, S11, S12) is configured to control the driving states or the non-driving states of the plurality of the solenoids at a vehicle speed equal to or greater than a predetermined value (A3) so that the automatic transmission (AT) is brought to the neutral state, when the target shift stage (3rd) set by the failure shift stage setting section (53b) is a first speed which is a maximum transmission ratio, and at which the engine braking is generated in the vehicle when the one of the solenoids (OM/OFF SOL) judged that the failure is generated is energized when the automatic transmission (AT) attains the target shift stage (3rd), and to control the driving states or the non-driving states of the plurality of the solenoids at a vehicle speed smaller than the predetermined value (A3) so that the automatic transmission attains the target shift stage (3rd) set by the failure shift stage setting section (53b), when the target shift stage (3rd) set by the failure shift stage setting section (53b) is a first speed which is a maximum transmission ratio, and at which the engine braking is generated in the vehicle when the one of the solenoids (OM/OFF SOL) judged that the failure is generated is energized when the automatic transmission (AT) attains the target shift stage (3rd); and the failure shift section (53b) is configured to control the driving states or the non-driving states of the plurality of the solenoids irrespective of the vehicle speed so that the automatic transmission (AT) attains the target shift stage (3rd) set by the failure shift stage setting section (53b) when the target shift stage (3rd) set by the failure shift stage setting section (53b) is not the first speed when the one of the solenoids judged that the failure is generated is energized when the automatic transmission (AT) attains the target shift stage.

That is, there is no need to provide a new (special) circuit configured to sense the short-circuit failure (Vbatt short) of the solenoid. Accordingly, it is possible to suppress the increase of the cost. In addition, at the failure target shift stage at which the excessive engine braking may be acted to the vehicle at the short-circuit failure, it is possible to prevent the sudden vehicle speed decrease at the failure of the solenoid at the high vehicle speed by through (via) the neutral state until the vehicle speed is decreased. Consequently, it is possible to stabilize the vehicle behavior (movement). On the other hand, when the failure target shift stage is not the shift stage at which the excessive engine braking is not generated, it is possible to rapidly ensure the driving force of the vehicle by controlling the driving states or the non-driving states of the plurality of the solenoids so that automatic transmission AT attains the failure target shift stage, irrespective of the vehicle speed.

The invention has been described above by reference to the first and second embodiments of the invention. Moreover, the present invention includes an example described below even when the structure is different from the structures of the first and second embodiments. In the first and second embodiments, the present invention is applied to the automatic transmission in which the four frictional engagement elements are selectively engaged by controlling the driving states and the non-driving states of the four solenoids to attain the four shift stages. However, the present invention is not limited to this structure. The present invention is applicable to an automatic transmission configured to attain a plurality of shift stages by selectively engaging the plurality of the frictional engagement elements by controlling the driving states and the non-driving states of the plurality of the solenoids, irrespective of the number of the solenoids, the number of the frictional engagement elements, and the number of the shift stages.

In the embodiments, the shift stage is fixed to the predetermined shift stage at the failure of the solenoid. However, the present invention is not limited to this structure. For example, at the failure of 2-4 brake solenoid 24/B SOL, the shift control may be performed between the first speed and the third speed. That is, the shift control may be continued between the shift stages which can be attained even at the failure state of the solenoid judged that there is the failure. The present invention is applicable to an automatic transmission in which the shift stage is not fixed to a predetermined shift stage at the judgment of the failure.

In the first embodiment, the threshold values of the vehicle speeds for releasing the neutral state are set to A1<A2. However, the threshold values may be set to A1=A2=A3. Moreover, these values are set independently.

In the present invention, when the OFF failure is sensed in the solenoid which performs the shift control of the automatic transmission, the shift stage is shifted to the failure target shift stage. When the sudden vehicle speed decrease may be generated at the generation of the short-circuited failure of the solenoid in a case in which the failure target shift stage is selected, the automatic transmission is brought to the neutral state until the vehicle speed is decreased to the predetermined value, and then the shift is performed. When the sudden vehicle speed decrease may not be generated at the generation of the short-circuited failure of the solenoid in case in which the failure target shift stage is selected, the shift stage is shifted to the failure target shift stage, irrespective of the vehicle speed.

Accordingly, there is no need to provide a new (special) circuit configured to sense a short-circuit failure of the solenoid. Therefore, it is possible to suppress the increase of the cost. In addition, at the failure target shift stage at which the vehicle speed may be suddenly decreased, the vehicle is brought to the neutral state. With this, it is possible to prevent the sudden vehicle speed decrease at the failure of the solenoid in the high vehicle speed state. Moreover, it is possible to stabilize the vehicle behavior (movement). On the other hand, when the failure target shift stage set at the failure of the solenoid is not the shift stage at which the vehicle speed may be suddenly decreased, it is possible to rapidly ensure the driving force of the vehicle by controlling the driving states and the non-driving states of the plurality of the solenoids so that the automatic transmission attains the failure target shift stage, irrespective of the vehicle speed.

The entire contents of Japanese Patent Application No. 2009-265406 filed Nov. 20, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An control apparatus for an automatic transmission arranged to selectively engage a plurality of frictional engagement elements by controlling driving states or non-driving states of the plurality of solenoids so as to attain a predetermined target shift stage, the control apparatus comprising:

a failure judging section configured to judge one of the solenoids in which a failure that the one of the solenoids is not energized is generated;

a failure shift stage setting section configured to set, to the target shift stage, a shift stage which can be attained in a state in which the one of the solenoids judged that the failure is generated is not energized when the failure judging section judges the failure of the one of the solenoids;

a failure neutral state through section configured to control the driving states or the non-driving states of the plurality of the solenoids at a vehicle speed equal to or greater than a predetermined value so that the automatic transmission is brought to a neutral state, when the target shift stage set by the failure shift stage setting section is a shift stage at which the vehicle speed is suddenly decreased when the driving states or the non-driving states of the solenoids are controlled so that the automatic transmission attains the target shift stage set by the failure shift stage setting section, and to control the driving states or the non-driving states of the plurality of the solenoids at a vehicle speed smaller than the predetermined value so that the automatic transmission attains the target shift stage set by the failure shift stage setting section, when the target shift stage set by the failure shift stage setting section is a shift stage at which the vehicle speed is suddenly decreased when the driving states or the non-driving states of the solenoids are controlled so that the automatic transmission attains the target shift stage set by the failure shift stage setting section; and a failure shift section configured to control the driving states or the non-driving states of the plurality of the solenoids irrespective of the vehicle speed so that the automatic transmission attains the target shift stage set by the failure shift stage setting section when the target shift stage set by the failure shift stage setting section is not the shift stage at which the vehicle speed is suddenly decreased when the driving states or the non-driving states of the plurality of the solenoids are controlled so that the automatic transmission attains the target shift stage set by the failure shift stage setting section.

2. The control apparatus as claimed in claim 1, wherein the failure neutral state through section is configured to control the driving states or the non-driving states of the plurality of the solenoids at the vehicle speed equal to or greater than the predetermined value so that the automatic transmission is brought to the neutral state, when the target shift stage set by the failure shift stage setting section is the shift stage at which the vehicle speed is suddenly decreased when the one of the solenoids judged that the failure is generated is energized when the automatic transmission attains the target shift stage, and to control the driving states or the non-driving states of the plurality of the solenoids at the vehicle speed smaller than the predetermined value so that the automatic transmission attains the target shift stage set by the failure shift stage setting section, when the target shift stage set by the failure shift stage setting section is the shift stage at which the vehicle speed is suddenly decreased when the one of the solenoids judged that the failure is generated is energized when the automatic transmission attains the target shift stage; and the failure shift section is configured to control the driving states or the non-driving states of the plurality of the solenoids irrespective of the vehicle speed so that the automatic transmission attains the target shift stage set by the failure shift stage setting section when the target shift stage set by the failure shift stage setting section is not the shift stage at which the vehicle speed is suddenly decreased when the solenoid judged that the failure is generated is energized when the automatic transmission attains the target shift stage.

3. The control apparatus as claimed in claim 1, wherein the failure neutral state through section is configured to control the driving states or the non-driving states of the plurality of the solenoids at a vehicle speed equal to or greater than a predetermined value so that the automatic transmission is brought to the neutral state, when the target shift stage set by the failure shift stage setting section is a shift stage at which the automatic transmission is interlocked when the one of the solenoids judged that the failure is generated is energized when the automatic transmission attains the target shift stage, and to control the driving states or the non-driving states of the plurality of the solenoids at a vehicle speed smaller than the predetermined value so that the automatic transmission attains the target shift stage set by the failure shift stage setting section, when the target shift stage set by the failure shift stage setting section is a shift stage at which the automatic transmission is interlocked when the one of the solenoids judged that the failure is generated is energized when the automatic transmission attains the target shift stage; and the failure shift section is configured to control the driving states or the non-driving states of the plurality of the solenoids irrespective of the vehicle speed so that the automatic transmission attains the target shift stage set by the failure shift stage setting section when the target shift stage set by the failure shift stage setting section is not the shift stage at which the automatic transmission is interlocked when the one of the solenoids judged that the failure is generated is energized when the automatic transmission attains the target shift stage.

4. The control apparatus as claimed in claim 1, wherein the failure neutral state through section is configured to control the driving states or the non-driving states of the plurality of the solenoids at a vehicle speed equal to or greater than a predetermined value so that the automatic transmission is brought to the neutral state, when the target shift stage set by the failure shift stage setting section is a first speed which is a maximum transmission ratio, and at which the engine braking is generated in the vehicle when the one of the solenoids judged that the failure is generated is energized when the automatic transmission attains the target shift stage, and to control the driving states or the non-driving states of the plurality of the solenoids at a vehicle speed smaller than the predetermined value so that the automatic transmission attains the target shift stage set by the failure shift stage setting section, when the target shift stage set by the failure shift stage setting section is a first speed which is a maximum transmission ratio, and at which the engine braking is generated in the vehicle when the one of the solenoids judged that the failure is generated is energized when the automatic transmission attains the target shift stage; and the failure shift section is configured to control the driving states or the non-driving states of the plurality of the solenoids irrespective of the vehicle speed so that the automatic transmission attains the target shift stage set by the failure shift stage setting section when the target shift stage set by the failure shift stage setting section is not the first speed when the one of the solenoids judged that the failure is generated is energized when the automatic transmission attains the target shift stage.

* * * * *